(12) United States Patent
Bunce et al.

(10) Patent No.: US 9,971,394 B2
(45) Date of Patent: *May 15, 2018

(54) CACHE ARRAY WITH REDUCED POWER CONSUMPTION

(71) Applicant: International Business Machines Corporation, Armonk, NY (US)

(72) Inventors: Paul A. Bunce, Poughkeepsie, NY (US); John D. Davis, Wallkill, NY (US); Diana M. Henderson, Poughkeepsie, NY (US); Jigar J. Vora, Westborough, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/501,091

(22) Filed: Sep. 30, 2014

(65) Prior Publication Data
US 2015/0019890 A1 Jan. 15, 2015

Related U.S. Application Data

(63) Continuation of application No. 13/622,191, filed on Sep. 18, 2012.

(51) Int. Cl.
*G06F 1/32* (2006.01)
*G06F 12/0853* (2016.01)

(52) U.S. Cl.
CPC .......... *G06F 1/3275* (2013.01); *G06F 1/3243* (2013.01); *G06F 12/0853* (2013.01); *Y02B 60/1225* (2013.01); *Y02B 60/1228* (2013.01)

(58) Field of Classification Search
CPC ............................ G06F 1/3275; G06F 1/3287
See application file for complete search history.

(56) References Cited

U.S. PATENT DOCUMENTS

| | | |
|---|---|---|
| 5,249,160 A | 9/1993 | Wu et al. |
| 5,539,892 A | 7/1996 | Reininger et al. |
| 5,809,532 A | 9/1998 | Eno et al. |

(Continued)

FOREIGN PATENT DOCUMENTS

| | | |
|---|---|---|
| JP | 02006252748 A | 9/2006 |
| WO | 2010050283 A1 | 5/2010 |
| WO | 2011025663 A1 | 3/2011 |

OTHER PUBLICATIONS

Anonymous; "A Bit Line Topology that Enables Column Selection for 8T SRAM"; Aug. 25, 2010; IP.com No. IPCOM000199084D.

*Primary Examiner* — Kim Huynh
*Assistant Examiner* — Eric Chang
(74) *Attorney, Agent, or Firm* — Cantor Colburn LLP; Margaret A. McNamara

(57) ABSTRACT

Embodiments of the disclosure include a cache array having a plurality of cache sets grouped into a plurality of subsets. The cache array also includes a read line configured to receive a read signal for the cache array and a set selection line configured to receive a set selection signal. The set selection signal indicates that the read signal corresponds to one of the plurality subsets of the cache array. The read line and the set selection line are operatively coupled to the plurality of cache sets and based on the set selection signal the subset that corresponds to the set selection signal is switched.

5 Claims, 4 Drawing Sheets

(56) References Cited

U.S. PATENT DOCUMENTS

| | | | |
|---|---|---|---|
| 5,911,153 A * | 6/1999 | Dhong | G06F 12/0864 |
| | | | 711/213 |
| 7,443,759 B1 | 10/2008 | Rowlands et al. | |
| 7,904,658 B2 * | 3/2011 | Abadeer | G06F 12/0864 |
| | | | 365/226 |
| 2005/0071565 A1 * | 3/2005 | Goodrich | 711/128 |
| 2006/0083074 A1 | 4/2006 | Cottier et al. | |
| 2008/0164933 A1 | 7/2008 | Gschwind et al. | |
| 2009/0103386 A1 | 4/2009 | Rao | |
| 2010/0260000 A1 | 10/2010 | Sridhara | |
| 2011/0055610 A1 | 3/2011 | Chen | |
| 2011/0141826 A1 | 6/2011 | Lee et al. | |

* cited by examiner

CACHE ARRAY WITH REDUCED POWER CONSUMPTION

DOMESTIC PRIORITY

This application is a continuation application of the legally related U.S. Ser. No. 13/622,191 filed Sep. 18, 2012, the contents of which are incorporated by reference herein in their entirety.

BACKGROUND

The present invention relates generally to reducing power consumption in a processor, and more specifically, to reducing power consumption due to cache accesses in a processor.

Processors generally include one or more cache memories to allow faster access to frequently used instructions and data. Commonly, such caches include both an instruction cache and a data cache. The presence or absence of instructions and/or data in a processor cache memory has a significant impact on the processor performance as the execution speed of the processor decreases dramatically if instructions and/or data have to be fetched from the main memory. Accordingly, even though only a small number of cache lines are required to execute the majority of instructions required by a software program within a processor, instruction caches are typically configured to be multi-set associative to reduce the amount of cache misses.

In general, the multi-set associativity of the cache increases the power consumption of the cache because the multiple sets of the cache are typically accessed in parallel to increase the performance, by reducing the access latency, of multi-set associative caches, even though the desired instruction or data is only located in one of the sets. By simultaneously accessing each of the cache sets, significant power is wasted by unnecessarily accessing cache sets that do not contain the desired instruction or data. As more and more processing cores are placed on a chip, the amount of performance throughput per watt continues to increase and the power associated with cache associativity becomes more and more expensive.

SUMMARY

Embodiments of the disclosure include a method for reducing power consumption of a cache array having a plurality of cache sets. The method includes receiving a read signal for the cache array and receiving a set selection signal indicating that the read signal corresponds to a subset of the plurality of cache sets of the cache array. Based on the set selection signal, the method also includes reading only the cache sets of the subset of the cache array.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiment are apparent from the following detailed description taken in conjunction with the accompanying drawings in which:

DETAILED DESCRIPTION

In exemplary embodiments, methods, systems and computer program products are provided for reducing power consumption in a cache array. In exemplary embodiments, the cache array is configured to only permit switching for the desired sets to be read. For example, during a read when a desired cache set, or subset, is known at the time of memory access, the desired set information can be incorporated to control the propagation of read data from the array through bit lines to the downstream output latches. Gating the bit lines for non-identified cache sets prevents them from switching, thereby eliminating their contribution to the array macro's active switching power and reducing the overall macro power consumption of the cache array.

Figure 1:
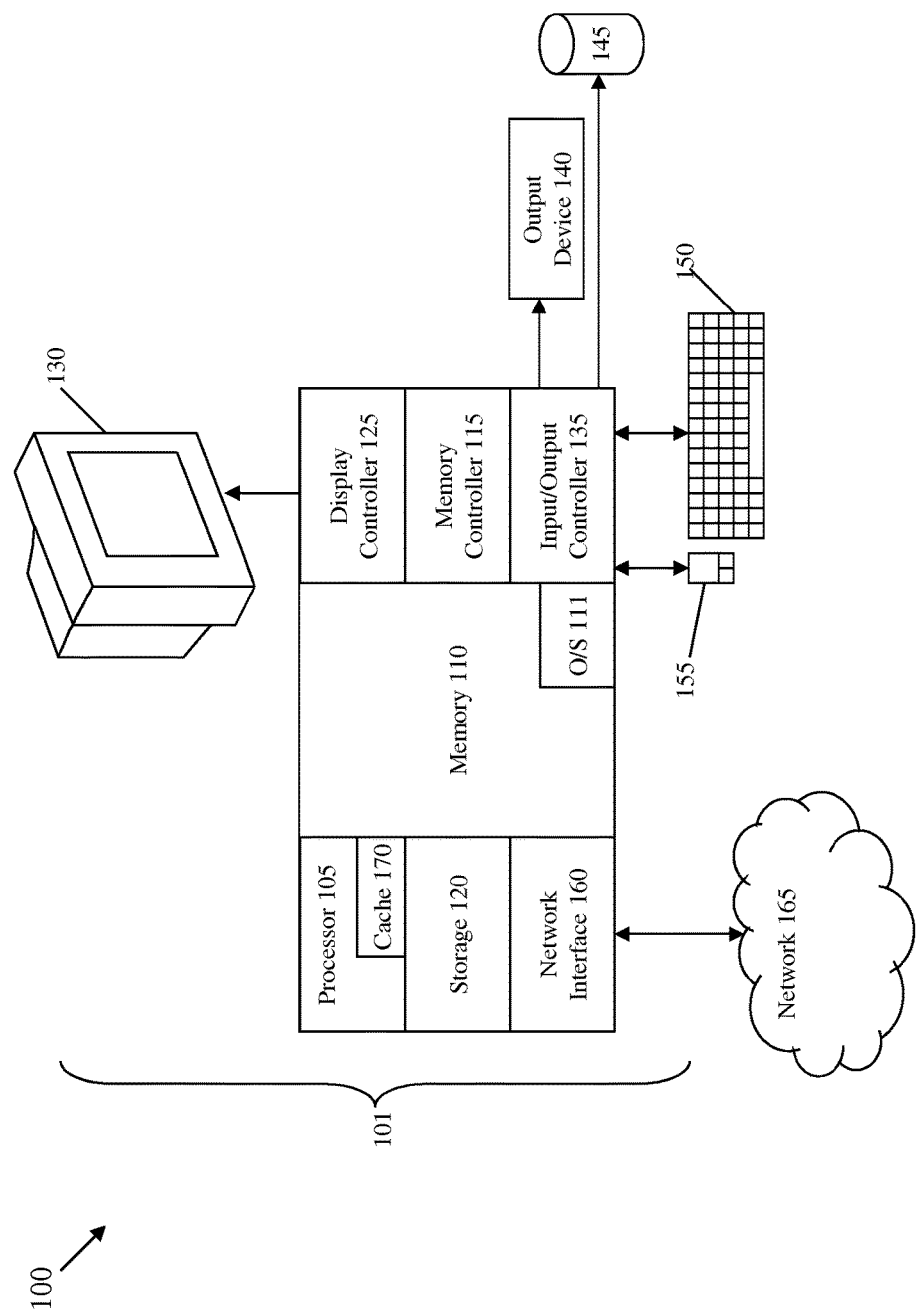
FIG. 1 depicts a block diagram of a system in accordance with an exemplary embodiment.

FIG. 1 illustrates a block diagram of a system 100 for reducing power consumption of a cache array having a plurality of cache sets. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions.

Figure 2:
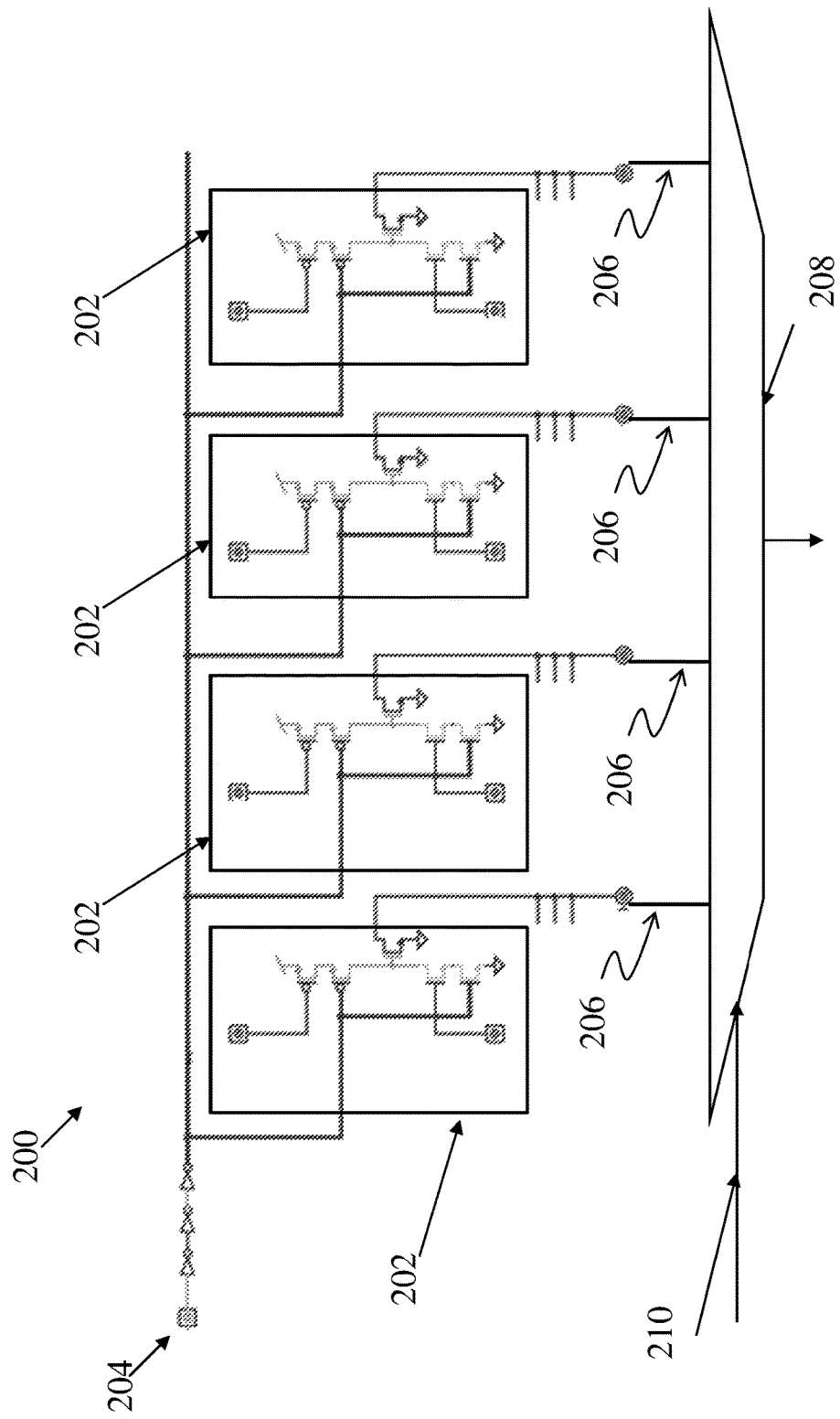
FIG. 2 depicts a schematic of diagram of a cache array having a plurality of cache sets.

Referring now to FIG. 2, a diagram illustrating a portion of a traditional multi-set cache array 200 is shown. As illustrated, the multi-set cache array 200 includes four cache sets 202. Information stored within the cache sets 202 is accessed using a read signal 204. In exemplary embodiments, the read signal 204 is configured to cause each of the cache sets 202 to write the data stored in each cache set 202 to an associated global bit line 206. The global bit lines 206 are input into a multiplexer 208 which receives a set selection signal 210. Based on the set selection signal 210, the multiplexer 208 outputs the desired data received from one of the cache sets 202. As described above, reading from the traditional multi-set cache array 200 requires each of the cache sets 202 to be powered and read. Since accessing each cache set 202 requires power, accessing all four cache sets 202 in parallel wastes power by unnecessarily accessing the subset of cache sets 202 that do not contain the desired instruction or data.

Figure 3:
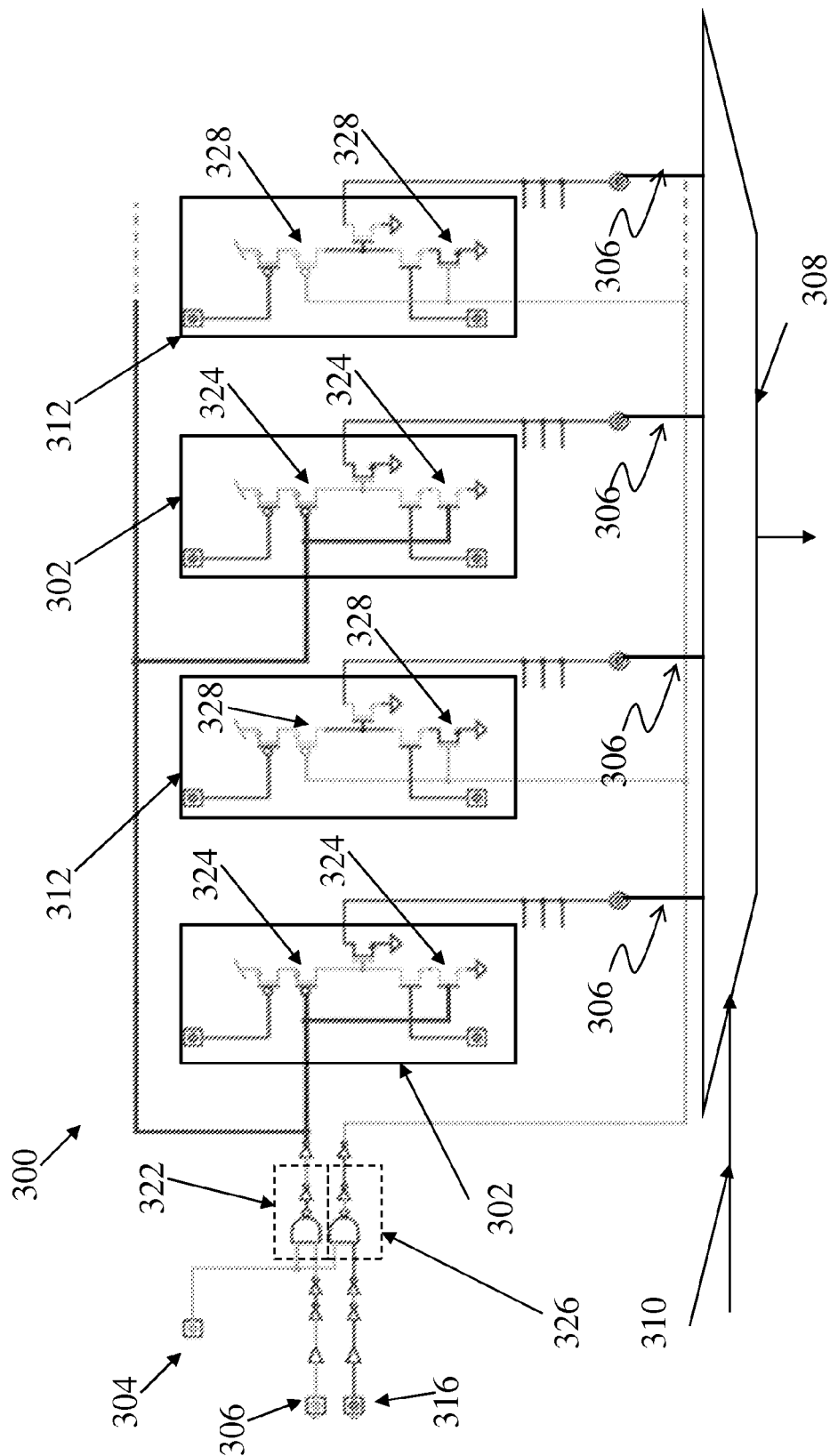
FIG. 3 depicts a schematic of diagram of a cache array having a plurality of cache sets in accordance with an embodiment.

Referring now to FIG. 3, a schematic diagram of a cache array 300 having a plurality of cache sets in accordance with an embodiment is shown. The cache array 300 includes a read signal 304 and two or more set selection signals 306, 316. In exemplary embodiments, the cache sets 302, 312 of the cache array 300 are grouped into subsets that each correspond to a set selection signal 306, 316. Each of the set selection signals 306, 316 is configured to enable access to the cache sets 302, 312 of a corresponding subset. In exemplary embodiments, the cache array 300 may include a multiplexer 308 that is coupled to each of the cache sets 302, 312. The multiplexer 308 may receive a selection signal 310, which can be used to select the desired cache set 302, 312 from the subset activated by the set selection signals 306, 316.

In exemplary embodiments, the cache array 300 is configured to utilize a local evaluation structure to determine if a cache set should be activated during a read access. In exemplary embodiments, the read signal 304 and the set selection signals 306, 316 control the propagation of a local bit line of each column of the cache array 300 during a read. In exemplary embodiments, the set selection signal 306, 316 are configured to selectively activate one or more subsets of cache sets 302, 312 when the desired cache set is known at the time of the read instruction. In exemplary embodiments, if the desired cache set is not known at the read instruction, the set selection signals 306, 316 may both be active, and all of the cache sets 302, 312 can be read in parallel.

In one example, the read signal 304 and the set selection signal 306 are both active and, as a result, the AND gate 322 becomes active. Once the AND gate 322 is activated, it activates the gates on the transistors 324, which enables the cache sets 302 to provide input signals to the multiplexer 308. In addition, since the set selection signal 316 is not active, the cache sets 312 are not activated.

In another example, the read signal 304 and the set selection signal 316 are both active and, as a result, the AND gate 326 becomes active. Once the AND gate 326 is activated, it activates the gates on the transistors 328, which enables the cache sets 312 to provide input signals to the multiplexer 308. In addition, since the set selection signal 306 is not active, the cache sets 302 are not activated.

In exemplary embodiments, a cache array may include four cache sets that can be grouped into two or more subsets.

In one example, the cache sets may be grouped into two subsets, as shown in FIG. 2. In another example, the cache sets may be grouped into four subsets. In exemplary embodiments, if the cache sets of the cache array are grouped into subsets that only contain one cache array, the cache array may not include a multiplexer or a subset selection signal. It will be understood by those of ordinary skill in the art that the cache array may include various numbers of cache sets, which may be grouped into any number of subsets. Since accessing each cache set requires power, reducing the number of cache sets accessed during each read saves power by preventing unnecessarily access to cache sets that do not contain the desired instruction or data. While the power consumption of the cache array can be reduced by grouping the cache sets into multiple subsets, the circuitry of the cache array becomes more complex with the addition of each subset grouping. Accordingly, in exemplary embodiments, the number of subsets is less than the number of cache sets of the cache array. In exemplary embodiments, the number of subsets is half of the number of cache sets.

Figure 4:
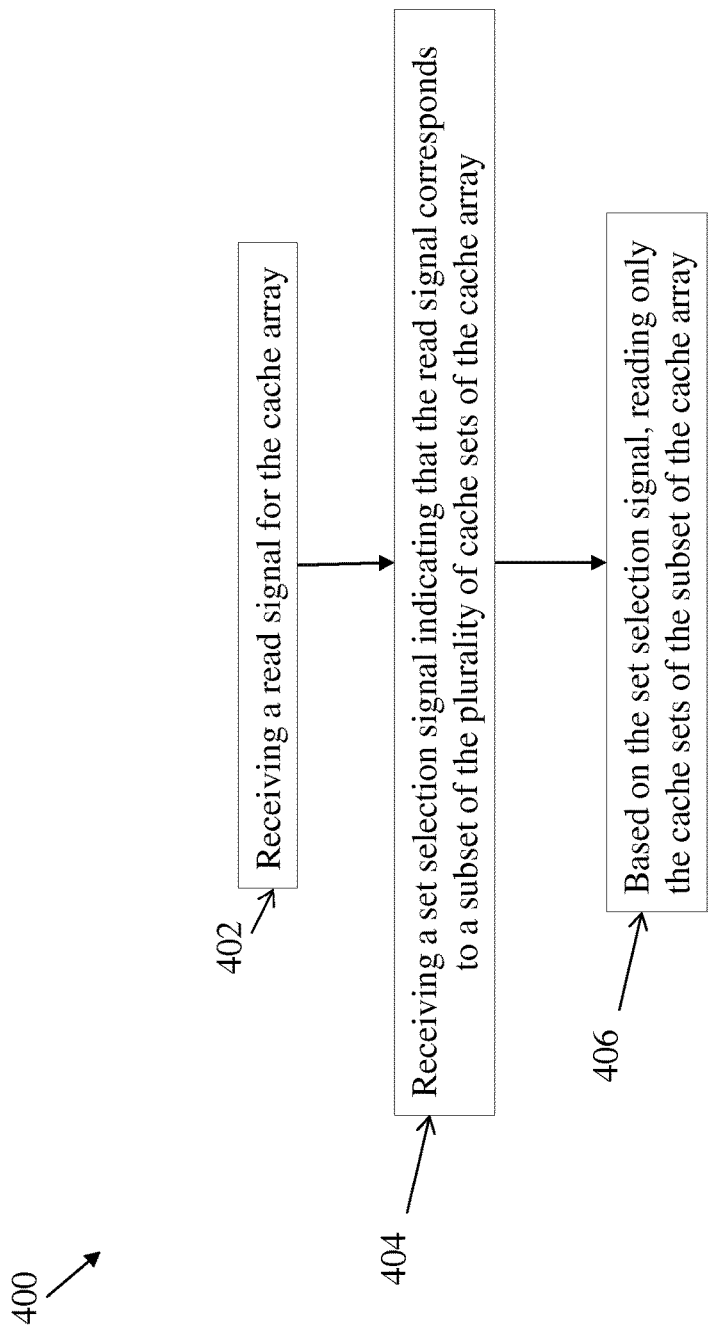
FIG. 4 depicts flow chart illustrating a method for reducing power consumption of a cache array having a plurality of cache sets in accordance with an embodiment.

Referring now to FIG. 4, a flowchart illustrating a method 400 for reducing power consumption of a cache array having a plurality of cache sets is shown. As illustrated at block 402, the method 400 includes receiving a read signal for the cache array. Next, as shown at block 404, the method 400 includes receiving a set selection signal indicating that the read signal corresponds to a subset of the plurality of cache sets of the cache array. Based on the set selection signal, the method 400 includes reading only the cache sets of the subset of the cache array, as shown at block 406. In exemplary embodiments, reading the cache sets of a subset includes switching a bit line of each of the cache sets of the subset. By reducing the number of cache sets that are accessed during each read access, the overall power consumption of the cache array is reduced.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for reducing power consumption of a cache array having a plurality of cache sets that are grouped into a number of subsets, the method comprising:
   receiving a read signal, via a read line, for the cache array;
   receiving a subset selection signal, via a set selection line, indicating that the read signal corresponds to one of the subsets of the cache array; and
   based on the subset selection signal, reading only the cache sets of the subset of the cache array,
   wherein reading the cache sets of the subset of the cache array further comprises multiplexing an output of each of the cache sets of the subset and wherein the read line and the set selection line are operatively coupled to one or more of the plurality of cache sets through one or more logic gates such that both the read signal and the set selection signal must be high for a corresponding cache set to provide an output, thereby gating a bit line for non-identified cache sets from the plurality of cache set to prevent the non-identified cache sets from the plurality of cache set from drawing power.

2. The method of claim 1, wherein reading the cache sets of the subset of the cache array comprises switching a bit line of each of the cache sets of the subset.

3. The method of claim 1, wherein the subset of the plurality of cache sets of the cache array includes two cache sets.

4. The method of claim 1, wherein the subset selection signal and the read signal are received contemporaneously.

5. The method of claim 1, wherein a number of subsets is less than a number of cache sets.

* * * * *